Jan. 19, 1965   F. R. HOHMANN, ETAL   3,166,397
APPARATUS FOR HEAT TREATING GLASS SHEETS
Original Filed Aug. 22, 1951   2 Sheets-Sheet 2
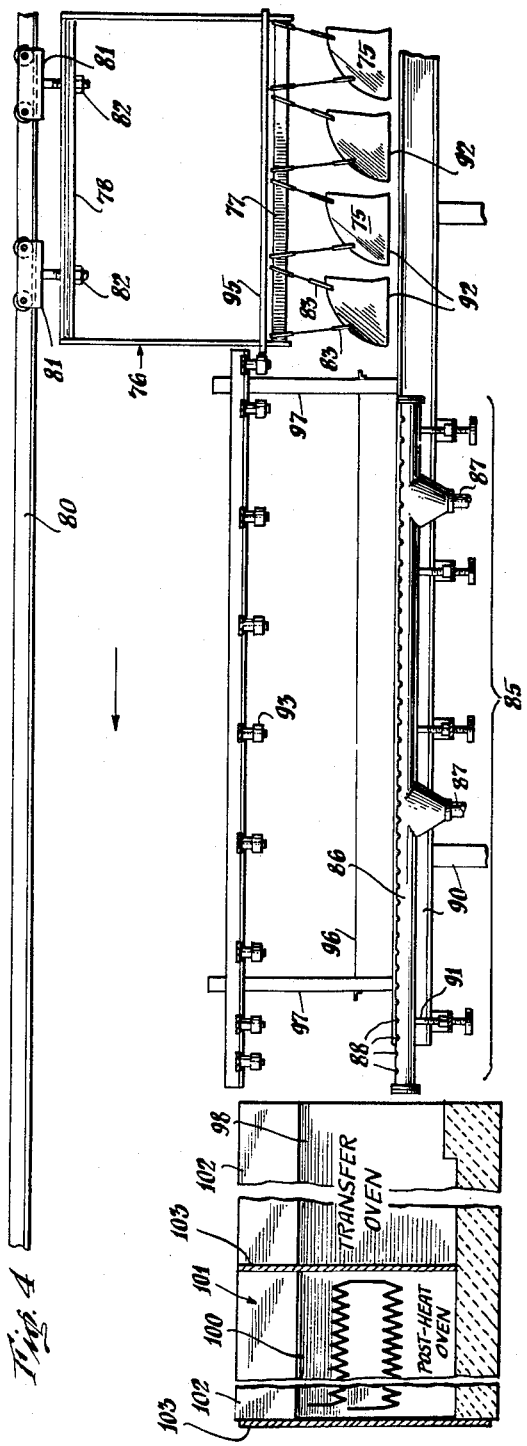
INVENTORS
Homer E. Neely, Jr and
BY Frederick R. Hohmann
Oscar H. Spencer
ATTORNEY 3,166,397
APPARATUS FOR HEAT TREATING GLASS SHEETS
Frederick R. Hohmann, New Kensington, and Homer E. Neely, Tarentum, Pa., assignors to Pittsburgh Plate Glass Company, a corporation of Pennsylvania
Application Mar. 8, 1957, Ser. No. 644,951, now Patent No. 2,971,294, dated Feb. 14, 1961, which is a continuation of application Ser. No. 243,148, Aug. 22, 1951. Divided and this application Mar. 14, 1960, Ser. No. 18,210
2 Claims. (Cl. 65—268)

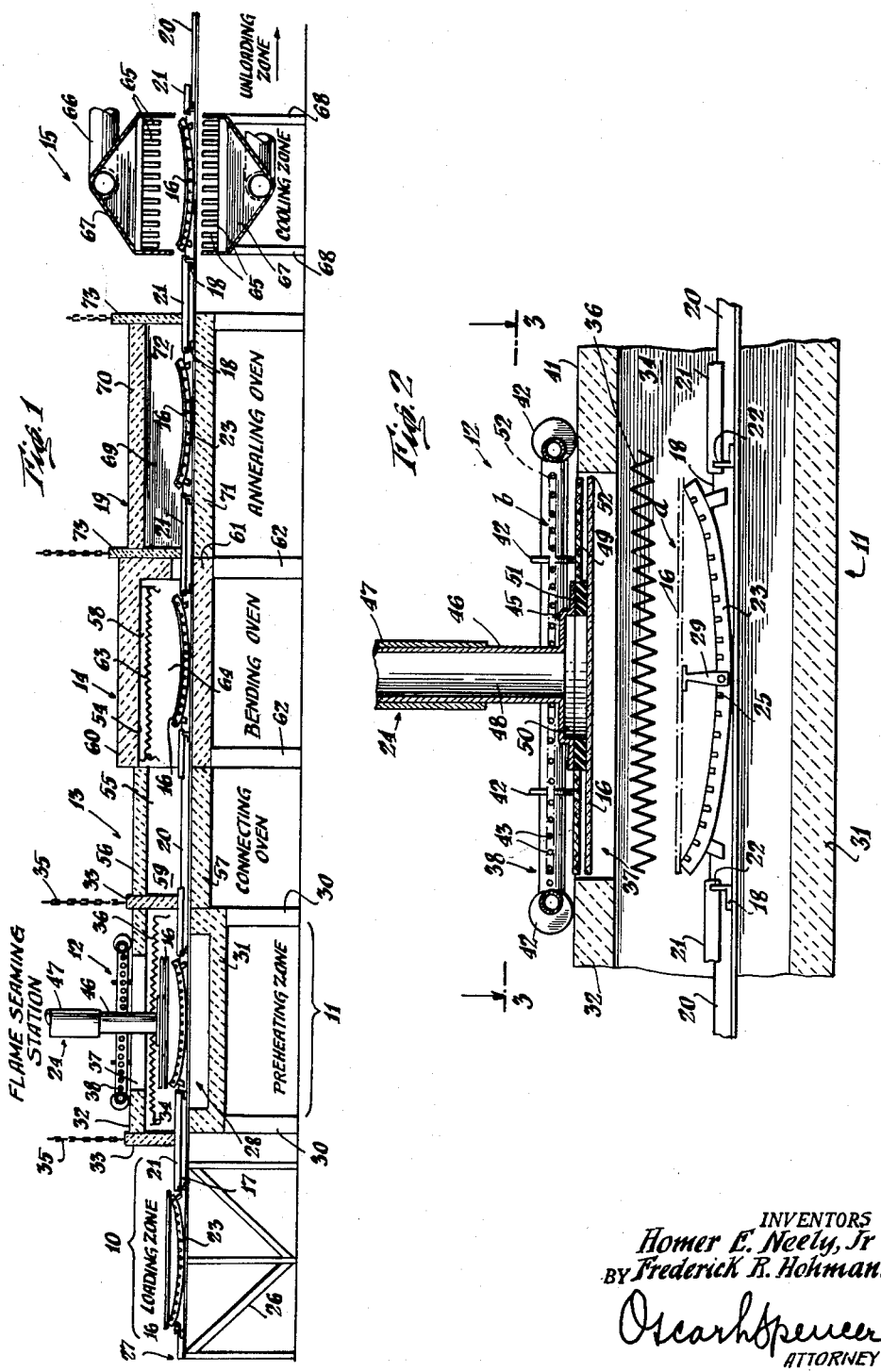

This invention relates to apparatus for heat treating the edges of glass and particularly to the flame treatment of the peripheral edges of glass sheets.

In order to cut flat glass, it is necessary to breach or score one surface by drawing a diamond or other cutting tool over the surface. Thereafter, the cut is completed by "running" the cut, i.e., breaking the glass along the score line by applying pressure to the scored surface of the glass on both sides of the score line while supporting the glass on the other surface thereof along the score line. In scoring or breaching the surface initially, the surface may develop vents running away from the score line. These vents may be small hair lines, chips, or other flaws in the glass surface. When the glass is thereafter subjected to heating and cooling operations in conjunction with the bending and/or tempering thereof, the vents in the surface of the glass will open up thus causing the glass to rupture and develop cracks or shatter.

Therefore, in order to eliminate the vents at the cut edge of the glass to prevent rupture and also to remove the sharp edges which might cause injury to those handling the glass pieces, it has been found desirable to treat the glass so that a relatively smooth edge is presented.

Removal of the vents by smoothing the edge has become of considerable importance in the case of glass sheets, such as may be used in tempered back lights in automobiles, for after such sheets are cut to the desired shape, they are subjected to bending and tempering operations.

To remove the sharp edges of cut pieces of glass plates, sanding or other abrasive apparatus has been used. This has been accomplished by passing the abrasive apparatus over the edges or passing the edges over a fixed sander running wet or dry. This type of manual seaming, i.e., smoothing of the rough edges by means of abrasion is a relatively slow operation and although it is partially effective in smoothing the edges, it is not always effective in eliminating the vents and other flaws which may cause the glass to rupture during bending and tempering.

Automatic seamers or edge smoothers have been developed in an attempt to perform the abrading operation automatically. In such seamers, the glass plate is clamped to a turntable which then passes between belt sanders, the two sides of the glass plate are ground simultaneously and then the two ends are ground. The automatic seamers are relatively slow for the apparatus is not adapted to treat all the edges of the glass at one time. Furthermore, unless the edges are subjected to prolonged abrading, some vents will remain which will cause a subsequent rupture of the glass.

An important object of the present invention is to provide apparatus for treating the cut edges of the glass plate pieces whereby the vents or other flaws in the glass will be healed or sealed in, so that they cannot cause a rupture of the glass when it is subjected to later bending and tempering operations.

Another object of the present invention is to provide an apparatus for treating the edges of glass plate pieces with a flame jet to seam the sharp edges and produce a relatively smooth edge.

Another object of the invention is to provide an apparatus in which a glass plate piece having cut edges may have all its edges treated simultaneously.

A still further object of the invention is to provide apparatus wherein at least one edge of a glass piece may be treated as it is continuously conveyed.

An additional object of the invention is to provide apparatus for seaming the edges of successive glass plate pieces prior to and continuous with subsequent treatment of the glass plate including such treatments as bending and tempering.

The invention includes apparatus for the flame seaming of at least one edge of a flat glass piece by impinging an open flame jet against the edge to be seamed, the flame being arranged in a sheet parallel to the edge of the glass and directed against the center of said edge, the sheet effect of the flame being achieved either by the movement of the peripheral edge of the glass across the impinging flame or by spacing a plurality of flame jets in a line such that they will produce a sheet of flame impinging against the center of an edge of the glass parallel to the plane surfaces of the plate of glass.

The apparatus in a more specific form provides a preheating zone and a means for moving the glass from the preheating zone into position so that flame jets are directed in a substantially continuous sheet against the entire peripheral edge of the piece of glass. The apparatus includes a post-heating chamber and an air cooling station and may also include a bending oven, when it is desired to bend the glass pieces after the flame seaming operation.

For a more complete description of specific embodiments of the invention including several forms which the invention may take, reference is made to the drawings wherein:

FIG. 1 is a schematic side view of one form of apparatus embodying the invention wherein the entire peripheral edge of a piece of glass may be flame seamed;

FIG. 2 is a more detailed longitudinal sectional view of the apparatus for flame seaming the entire peripheral edge of the piece of glass;

FIG. 3 is a plan view taken along the line 3—3 in FIG. 2; and

FIG. 4 is a side view of an alternate form of apparatus for flame seaming which is illustrative of our invention.

Referring to FIG. 1, one form of apparatus for flame seaming pieces of flat glass includes a loading zone 10, a preheating zone 11 and a superposed flame seaming station 12; a connecting oven 13, a bending oven 14, an annealing oven 19, and a cooling zone 15. The several zones and stations 10, 11, 12, 13, 14, 19, and 15 are spaced apart and disposed along a longitudinal path in sequential order except that the flame seaming station may be above the preheating zone 11. Pieces of flat glass 16 are moved into position in the several zones and ovens by means of a suitable conveyor 17 and into the flame seaming station by elevating means 24 as indicated in FIGS. 1 and 2.

The conveyor 17 indicated is made up of channel frame carriage members 18 adapted to slide along guideways 20; the carriages 18 may be connected to each other by link members 21 having slots 22 adapted to releasably engage the upstanding transverse channel members of the carriages 18.

The glass pieces 16 are positioned on molds 23, the molds being removably positioned in the carriages 18. The molds indicated in FIGS. 1 and 2 may be of the hinged type which are adapted to bend the pieces of glass disposed therein to a predetermined shape defined by the upper surface 25 of the molds. Other suitable types of molds also may be used.

The loading zone 10 includes a supporting frame 26 adapted to support the extensions 27 of the guideways 20 which are outside of the preheating zone 11. The carriages 18 with the mold 23 and the glass 16 are positioned as shown in FIG. 1 in the loading zone.

The preheating zone includes an oven 28 supported by suitable pillars 30 at the desired height. The oven is defined by floor member 31, a roof member 32, and suitable side members 34 parallel to the path of the conveyor through the oven; one of the side members 34 has been cut away in FIGS. 1 and 2. The oven is also defined by removable transverse sides 33 which may be moved vertically by lifting means acting through chains 35 to permit access to the ends of the oven along the path defined by the guideways 20 of the conveyor. The oven may be heated in any suitable manner, and, for purposes of illustration, electric heating coils 36 are shown as the heating medium.

The roof 32 is formed with a central opening 37 of sufficient size to permit a piece of glass to be raised from a position in the oven upwardly therethrough into the flame seaming station 12 while the glass is maintained in a substantially horizontal plane. The flame seaming station 12 includes a burner 38, arranged above the opening 37 as best shown in FIGS. 2 and 3. The flame seaming burner 38 comprises a pipe member 40 formed in substantially the same shape as the opening 37 of the oven, said opening and said flame seaming burner both corresponding in shape to the outer peripheral configuration of the pieces of glass 16 which are to be treated in the apparatus. The pipe member 40 is supported on the upper side 41 of the roof 32 by spacers 42.

The inner periphery of the pipe 40 is formed with a series of apertures 43 adapted to permit the flow of a suitable gas and air mixture therethrough to provide flame jets of the desired size. The apertures 43 are aligned in substantially the same plane around the inner periphery of the pipe 40.

The elevator means 24 for lifting the glass pieces into the flame seaming station includes a vacuum chuck 45 mounted on the lower end of a piston rod 46 which may be slidably mounted in a sleeve member 47 for vertical movement upward and downward. An inner bore 48 is provided in the piston rod 46 in connection with a suitable evacuating means (not shown) and connected with the suction face 50 of the vacuum chuck 45. Suitable air sealing means 51 may be provided around the suction face of the vacuum chuck.

The stroke of the piston is sufficient to raise the piece of glass 16 from the dot and dash line position (a) in FIG. 2 through the opening 37 to the dash line position (b) in the flame seaming station 12 wherein the peripheral edges 52 of the glass plate 16 are in alignment with the flame jets being emitted from the flame seaming burner 38.

The flame jets are emitted through the apertures 43 in a plane substantially parallel to the plane surfaces of the glass plate, when the latter is in the flame seaming position, so as to direct the flame of the several jets against the center of the glass edge and parallel to the glass surfaces.

By way of specific example, it has been found that satisfactory flame seaming may be achieved when the flame burner apertures are No. 50 size drill holes on ¼" centers and with the mouths of the respective jets being approximately 1" from the edge of the glass plate to be treated.

The connecting oven 13 comprises a chamber 55 defined by a roof portion 56, a floor portion 57 and suitable sides 59 parallel to the path of the conveyor. The ends of the connecting oven may be covered by removable doors as shown at the left-hand side of the connecting oven illustrated in FIG. 1 or they may be open-ended and in direct connection with the preheating zone 11 and the bending oven 14. Heat will flow into the chamber 55 of the connecting oven from the preheating zone 11 and from the bending oven 14 so that ordinarily no additional heater is required.

The bending oven 14 has a chamber 58, defined by a roof portion 60, a floor portion 61 and sides 64, parallel to the conveying path. The oven may be suitably supported on pillars 62 as shown in FIG. 1. Heating means such as electric coils 63 may be positioned on ceiling 54 of the bending oven to raise the temperature of the glass pieces positioned in the oven to the desired temperature.

The annealing oven 19 has a chamber 69 defined by roof portion 70, floor portion 71, sides 72, parallel to the conveyor and vertically movable ends 73. The annealing oven will ordinarily receive sufficient heat from the bending oven 14 so that no separate heating means is necessary. The annealing oven is provided in the apparatus to permit a gradual reduction of the temperature of the glass when an annealing process is being used.

The cooling and/or tempering zone 15 comprises cooling nozzles 65 spaced above and below the path of the conveyor, the cooling nozzles being connected to a source of cool forced air by suitable means such as connecting hood 67 and pipe 66. Supporting members 68 may be provided to support the cooling equipment in the desired position. The cooling nozzles may be fixed or mounted on oscillators so that nozzles may be oscillated in a plane spaced from the glass surface. The use of the oscillators provides a more even and rapid cooling of the glass surfaces. After the glass pieces move from the cooling zone, the guideways 20 may extend to a point where operators remove the treated articles.

In carrying out the process with the apparatus described to flame seam the edges of the glass, and bend and temper the glass pieces, any suitable temperatures or times of exposure may be used for such treatment. However, it has been found that the following temperatures and times of exposure have produced desirable results. Each glass piece 16, is moved from the loading zone 10 into the preheating zone 11. The zone 11 is maintained at a temperature of about 960° F. After the glass piece is preheated in zone 11, it is picked up by the vacuum chuck of the elevator means 24 and lifted into the flame seaming station 12. By positioning the peripheral edge of the glass piece about 1" from the flame burners, which have apertures of No. 50 size drill holes on ¼" centers, a satisfactory flame for effecting the seaming operation is produced. With natural gas rated at about 960 B.t.u. per cu. ft., an air to gas ratio of 9.3 to 1 with the burner using approximately 46.5 cu. ft. of gas per hour per foot of lineal extent of the burner pipe 40 has been found to produce satisfactory flame jets.

After holding the glass plate in the flame jets for approximately 10 to 15 seconds, the glass is lowered into the preheating zone and held clear of the mold for about 20 seconds to permit hardening of the edge so as to prevent distortion at the points where the glass contacts the mold. After replacing upon the mold 23, the glass and the supporting carriage 18 are conveyed to the bending oven 14 for the bending operation.

The temperature of the glass is maintained during the transfer from zone 11 to the bending oven 14 by pasing through the connecting oven 13. In the bending oven, the temperature of the glass piece is raised to the bending temperature which is approximately 1100° F. and the glass piece softens and sags until it conforms to the shape defined substantially by the upper profile 25 of the mold. After the glass piece is conveyed from the bending oven 14, it is subjected to rapid cooling in the zone 15, wherein the glass is tempered.

The cooling operation for tempering the glass will be discussed in greater detail in connection with an alternate form of operation wherein the bending step is omitted and the apparatus is used only for flame seaming and tempering.

In the case where the apparatus is thus used, i.e., with the bending step omitted, the glass is loaded on a flat mold, preheated and flame seamed as previously described, and thereafter, is replaced upon the flat mold; subjected to a post-heating and cooled to handling temperature of about 250° F. Thereafter, the glass can be transferred manually or otherwise to a mold for bending and tempering in accordance with standard practice.

It has been found that, if glass is preheated in a zone which is maintained at 960° F. for approximately eight minutes and is thereafter seamed and post-heated at 1060° F. for four minutes, it can safely be withdrawn for air cooling to handling temperature, without breaking. After the air cooling, the glass piece can be bent and tempered following standard procedure.

When the apparatus is being used without the bending and tempering step, the oven 14 can be utilized by maintaining it at 1060° F. for the post-heating of the glass. The glass will not be subjected to bending because it will be supported on the flat mold.

The cooling of the glass after it leaves the post-heating zone may be achieved by permitting the glass to return to the handling temperature by merely being exposed to the air. However, for purposes of a production line arrangement, as shown in FIG. 1, such air cooling would be impractical for it would require approximately a ten minute wait for the temperature of the glass pieces to drop from its post-heating temperature to 250° F.

It has been found that, by the positioning of air circulating fans two or three feet above and below the center of the glass piece to be cooled, the glass can be returned to the handling temperature more rapidly. In one particular case, it was found that, after allowing a two minute cooling in still air, after removal from the furnace and an additional three minute cooling between air circulating fans, the glass temperature could be reduced to 250° F.

Where a regular oscillator was used, in conjunction with air nozzles as illustrated at 15 in FIG. 1, satisfactory results were obtained when the nozzles 65 were ½" in diameter and on approximately 2" centers, the openings of the tubes being about 5½" from the glass surfaces. It was found that with 1 oz. air and with oscillation, the minimum safe time before turning on was three minutes and the 250° F. temperature was reached in a total time of four minutes.

With the fan set to deliver air at 3½ ozs. static pressure, and without oscillation, three minutes was again the minimum safe time, but the glass reached 250° F. after a total time of 3¾ minutes. Under the same conditions, with the oscillator in operation, the minimum turn-on time was 2½ minutes and the total time to reach 250° F. was 3¼ minutes.

The rapid air cooling of the glass after the post-heating or after the bending operations will cause the glass to be tempered. Tempered glass is stressed so that it has great strength. It is also brittle so that, when the surface is broken, the glass will crumble into small pieces having relatively dull edges.

If the glass is not to be tempered it may be moved into the annealing oven 19 after the bending or post-heating operations so that the glass may be cooled gradually. In this procedure the annealing oven is thus the only cooling area. Annealed glass has a minimum of internal stress but has less strength than tempered glass. Whether the glass is tempered or annealed after the flame seaming and bending operations depends largely upon the use to which it will be put or what subsequent operations it will be subjected to.

It will be understood that the movement of the glass pieces through the apparatus illustrated in FIGS. 1, 2 and 3 may be intermittent to permit appropriate dwells at the several zones and stations. For example, at the preheating zone 11, the movement of glass along the path of the conveyor is stopped so that the elevator 24 may operate to raise each glass piece into the flame seaming station and thereafter return it to the mold. It will also be appreciated that although the elevator means has been illustrated as a vacuum chuck operating from above the glass piece, suitable elevator means operating from below the glass piece may also be used.

When the apparatus is used in a combined operation, i.e., including the bending and tempering step, the glass piece may be supported on the bending molds at a slight angle to the horizontal plane. In such cases, suitable adjustments of the angle of the face of the vacuum chuck and the angle of the flame seaming burner should be made so that the respective parts are at an angle corresponding to the angle of the piece of glass. If it is not desired to change the angle of the face of the vacuum chuck, the entire elevating means may be disposed at an angle to bring the face of the vacuum chuck into alignment with the planar surface of the glass plate.

The bending mold may be equipped with retractable fingers 29, as shown in FIGS. 1 and 2, extending from the upper surface 25 of the molds 23 to the underside of the glass pieces to prevent premature bending or sagging of the glass during the steps preceding the bending and tempering operation. The retractable fingers are moved out of position to permit the bending of the glass at any suitable time before the bending operation.

The positioning of the flame seaming station above the preheating zone, as shown in FIGS. 1, 2 and 3, is an example of one possible arrangement of the various stations and zones with respect to each other, and it will be appreciated that the stations may be arranged in other positions without departing from the scope of the invention.

In order to reduce heat loss through the opening 37, in the roof of the preheating oven, a heat insulating plate 49 may be fixed on the elevating means 24, so as to substantially seal the opening 37 when the elevating means is in the normal position, indicated by the full line position shown in FIG. 2.

An alternate form of flame seaming apparatus and the method of seaming a single edge of successive plate glass pieces is illustrated in FIG. 4. The alternate form may include a frame 76 on which pieces 75 are carried. The frame may consist of a lower bar member 77 and an upper bar member 78, the frame 76 being connected to an overhead tramrail 80 by trolleys 81. The trolleys are fixed to the frame by nuts and bolts 82. The pieces of glass 75 to be treated are suspended from the bar 77 of the frame 76 by holder members 83.

The apparatus includes a flame seaming station 85 which comprises a flame seaming burner 86 which may be a lineal pipe member connected with suitable mixed air and gas inlet pipes 87. Apertures 88 are formed in a line along the top of the pipe 86. The flame seaming pipe 86 is supported on frame 90 of the apparatus by adjustable screw members 91 so that the burner may be raised or lowered as desired.

Additional guide means are included in the flame seaming station to assure the continued alignment of the glass edges 92 which are to be flame seamed by flame jets from the apertures 88 disposed along the top of the flame burner 86. The additional guide apparatus consists of roller guides 93 which engage guide bars 95 fixed to the sides of the carriage 76. The function of the roller guides 93 is to steady the frame 76.

The glass pieces 75 are maintained against lateral misalignment by wire guides 96 stretched between upright frame members 97. The wires 96 are drawn tightly between the frame members 97 and are adapted to be in light sliding engagement with the faces of the glass pieces 75.

It has been found that a flame seaming burner of approximately 8' in length will perform the desired seaming operation as the edges 92 of the glass pieces 75 are passed through the apparatus shown in FIG. 4 in the direction indicated by the arrow, the glass pieces being moved through the apparatus at the rate of 190 inches per minute. After the flame seaming operation, the pieces may be moved through a transfer oven, such as that shown at 98, and thereafter may be suitably post-heated in oven 100. The glass pieces may then be annealed or tempered in any suitable manner. The transfer oven 98 and the post-heating oven 100 may be formed with a slot 101 in roof portions 102 thereof to receive the frame 76 as it is moved along the tramrail 80. Suitable doors 103 may be provided at both ends of the post-heating oven 100 to prevent heat losses therefrom. With the apparatus in FIG. 4, it is possible and practical to continuously flame seam one edge of successive glass pieces as they are moved through the apparatus. This form of the apparatus is particularly useful in the flame seaming of glass pieces such as automobile ventilator lights when it is desired to flame seam only one of the edges. When only one edge of the glass is to be flame seamed in the manner illustrated in FIG. 4, it is not necessary to preheat the glass for it is enveloped in heat rising from the jets 88, and the areas adjacent to the edge are sufficiently heated during the flame seaming so that no localized stresses develop which might cause the glass to crack. However, it is desirable to post-heat the entire glass piece before annealing or tempering to assure that the glass piece is evenly heated throughout.

The flame seaming treatment of the sharp edges of glass pieces results in a smooth edge which may be slightly rounded at the juncture of the edge with the plane surfaces of the glass so there is little danger of injury during the manual handling of the glass pieces. There is also a reduction of breakage during the bending and tempering operation when the pieces of glass have been flame seamed because the flame seaming has the effect of softening the glass at the edges so that it seals any vents or flaws in the edge. The sealing of the vents prevents them from opening and rupturing the glass during the subsequent bending and tempering operations.

By the use of the method and apparatus of this invention, a large number of glass pieces may be seamed rapidly and the seamed edges are superior to those produced by manual or automatic abrading seaming operations.

In accordance with the provisions of the patent statutes, we have herein described the principle of operation of the invention, together with the elements which we now consider the best embodiments thereof, but we desire to have it understood that the structure disclosed is only illustrative and the invention can be carried out by other means. Also, while it is designed to use the various features and elements in the combinations and relations described, some of these may be altered and modified without affecting the more general results outlined.

This application is a division of application Serial No. 644,951 of Frederick R. Hohmann and Homer E. Neely, Jr. for Method and Apparatus of Flame Seaming, filed March 8, 1957, now Patent No. 2,971,294 which is, in turn, a continuation of application Serial No. 243,148 of Frederick R. Hohmann and Homer E. Neely for Method and Apparatus of Flame Seaming, filed August 22, 1951 now abandoned.

Having thus described our invention, we claim:

1. Apparatus for converting a flat sheet of glass into a flame seamed curved sheet of glass including a gas burner having a row of nozzles directed horizontally and at least as long as one edge of the glass sheet, said nozzles being closely spaced so as to form effectively a sheet of flame, upward lifting means for moving said sheet broadside in a direction at right angles to the plane of the flame to bring an edge of the glass sheet into alignment with said row of nozzles so that said sheet of flame impinges on said edge, preheating means located below said burner, said upward lifting means being operable to lift a sheet from said preheating means to said burner and return it to said preheating means, lateral conveyor means for moving a sheet horizontally into said preheating means and removing a sheet horizontally from said preheating means, and glass sheet support means including a bending mold having extremities located in a horizontal plane, and an upper shaping surface of concave elevation, and a movable glass support member located between the mold extremities and movable into a first position above the intermediate portion of said upper shaping surface terminating in the horizontal plane defined by the mold extremities to contact and support the bottom surface of the flat glass sheet intermediate its extremities, and movable into a second mold position below said upper shaping surface.

2. A unitary structure for flame seaming and molding flat sheets of glass which comprises a movable carriage, a series of molds mounted in spaced relation on the carriage, a series of interconnecting furnaces through which the molds pass in succession and a preliminary support for the carriage outside of the furnaces where the flat sheets of glass are loaded on the mold, a preheating furnace into which the mold first carries the flat sheet of glass, flame seaming means comprising a gas burner having a row of nozzles at least as long as one edge of the sheet, said nozzles being closely spaced so as to form effectively a sheet of flame, means for moving the sheet from the mold into edgewise alignment with the flame seaming means and for returning the sheet to the mold, a bending oven into which the mold then carries the sheet, and means for applying sufficient heat thereto so that the sheet after it is flame seamed becomes conformed to the mold.

References Cited in the file of this patent
UNITED STATES PATENTS

| | | |
|---|---|---|
| 1,577,581 | Knight | Mar. 23, 1926 |
| 2,131,873 | Goodwillie | Oct. 4, 1938 |
| 2,247,118 | Drake | June 24, 1941 |
| 2,369,368 | Paddock et al. | Feb. 13, 1945 |
| 2,758,422 | Jendrisak | Aug. 14, 1956 |